United States Patent
Gerber et al.

[11] 3,785,898
[45] Jan. 15, 1974

[54] APPARATUS FOR PRODUCING SEAMED ARTICLES FROM SHEET MATERIAL

[75] Inventors: Heinz Joseph Gerber; David Raymond Pearl, both of West Hartford, Conn.

[73] Assignee: Gerber Garment Technology, Inc., East Hartford, Conn.

[22] Filed: Jan. 14, 1972

[21] Appl. No.: 217,921

[52] U.S. Cl............... 156/353, 118/8, 156/356, 156/533, 156/575
[51] Int. Cl.................. B26d 5/00, B05c 11/00
[58] Field of Search............... 156/291, 285, 250, 156/286, 510, 523, 353, 526, 356, 527, 530, 532, 533, 548, 549, 575; 118/4, 7, 8, 35–42

[56] References Cited
UNITED STATES PATENTS

| | | | |
|---|---|---|---|
| 3,156,927 | 11/1964 | Grimm et al............... | 156/291 |
| 3,312,562 | 4/1967 | Miller....................... | 118/8 |
| 2,993,824 | 7/1961 | Richaudeau............... | 156/285 |

*Primary Examiner*—Douglas J. Drummond
*Attorney*—Donald K. Huber

[57] ABSTRACT

A plurality of layers of sheet material, to be joined to one another along desired seam lines to produce garment components or other articles, are supported on a supporting surface. An applicator member movable in the plane of the supporting surface deposits a bonding agent along the seam lines. This deposition of the bonding agent may be made on the top surface of the first sheet prior to the spreading of the second sheet thereover or may be made on the top surface of the second sheet after its spreading over the first sheet. The bonding agent is thereafter activated, if necessary, to cause it to adhere to and join together the two layers, and the layers are thereafter cut along or adjacent the seam lines to produce the finished articles. The applicator member is supported and moved along the seam lines by a carriage driven relative to the supporting surface by a numerically controlled drive system. The activation of the bonding agent and the cutting of the layers may be performed by an activating member and a cutting tool also driven along the seam lines by the numerically controlled drive system. The activating means may also be a means for applying activating energy and/or pressure over the entire area of the sheets. The bonding agent may also be supplied in the form of third sheet or film, in which case the applicator member may be omitted. Vacuum may be used to hold the sheets in place during the various operations performed thereon and in particular to press the two sheets to one another during the activation of the bonding agent.

13 Claims, 12 Drawing Figures

PATENTED JAN 15 1974 3,785,898

APPARATUS FOR PRODUCING SEAMED ARTICLES FROM SHEET MATERIAL

BACKGROUND OF THE INVENTION

This invention relates to apparatus for producing seamed articles from sheet material, and deals more particularly with such apparatus wherein the articles are made from two, or possibly more, layers of sheet material spread on top of one another and joined along desired seam lines before being cut.

In the past, it has been common practice to make clothing, upholstery items and many other articles from limp sheet material by first cutting pieces from sheets and then joining them to one another by stitching or sewing. This process usually does not lend itself readily to automation or rapid production and normally requires many hand operations. It is also known to make seamed articles, such as inflatable toys made from sheets of thermoplastic material, by spreading two such sheets on top of one another, heat sealing them along desired seam lines and then separating the finished products from the remainder of the sheets by cutting along or adjacent the seam lines. This process is usually much more economical and less time consuming than the joining of previously cut pieces, but is not adapted to the joining of materials other than those which are at least somewhat thermoplastic. Also, for volume production the heat sealing in the past has been accomplished through the use of relatively expensive heating elements which are of a shape conforming to the desired shape of the seam line, and such heating elements are difficult or impossible to convert to a different shape when desiring a different shape of seam line.

The general object of this invention is, therefore, to provide an apparatus for producing seamed articles from sheet material which apparatus is of such a character as to lend itself well to automation whereby the amount of manual labor required for producing the articles is reduced to a minimum.

A further object of this invention is to provide an improved apparatus for joining a wide variety of sheet materials, not necessarily of a thermoplastic nature, along desired seam lines while the sheets of material are supported by a supporting surface and for thereafter cutting the sheets, while supported on the same surface, to produce finished articles.

A further object is to provide a apparatus of the foregoing character wherein the shapes of the articles produced may be readily varied without requiring drastic modification of the apparatus.

SUMMARY OF THE INVENTION

The invention resides in apparatus for making seamed articles, such apparatus including a supporting surface for supporting sheets of material, a numerically controlled member for applying bonding agent along desired seam lines, an activating means, which may be such as to distribute activating energy over the entire area of the sheets or which may be a member driven by numerical control along the seam lines, for activating the bonding agent, and a numerically controlled cutting tool for cutting the layers along the seam lines after joining. It also optionally includes a means for applying a vacuum to the supporting surface for attracting and holding the two layers of sheet material to such surface and to one another. If the bonding agent is supplied in the form of a sheet of such material spread between or on top of the two sheets to be joined thereby, the applicator member may be omitted. If the bonding agent is one requiring no activation to render it effective, the activating member may be omitted.

DETAILED DESCRIPTION OF THE PREFERRED EMBODIMENTS

Figure 1:
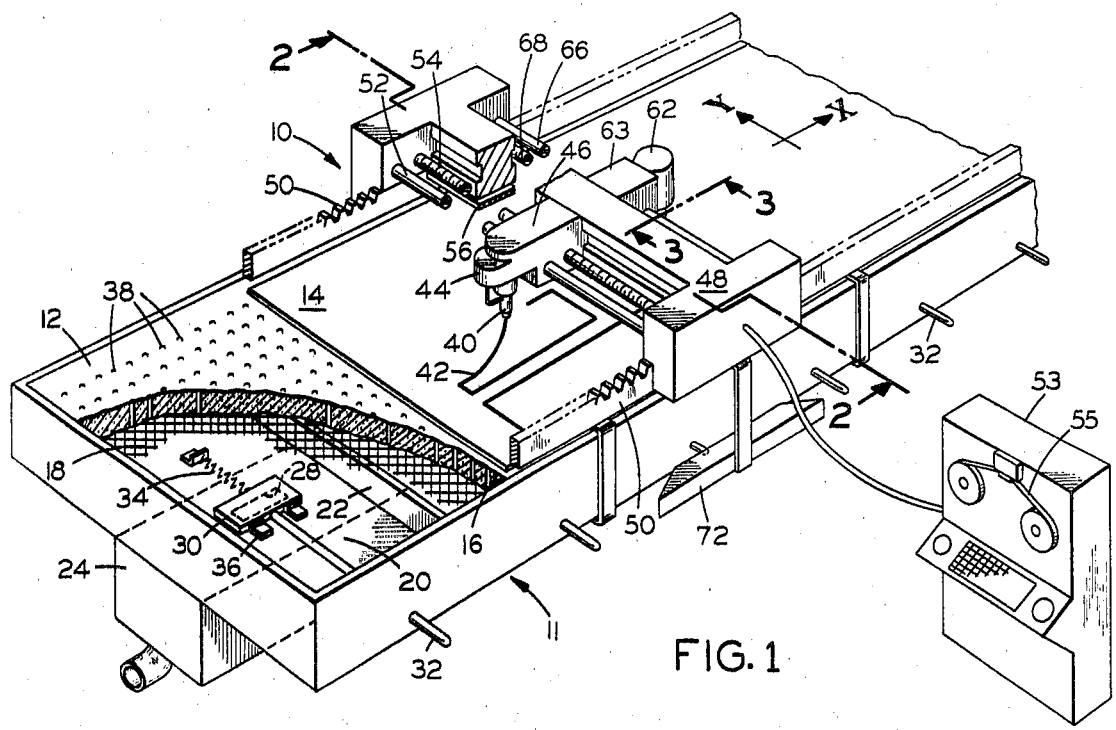
FIG. 1 is a perspective view showing an apparatus made in accordance with this invention.

Before turning to the accompanying drawings, the broader aspects of the method of this invention should be considered. In accordance with this method, two sheets of material are provided and are spread on top of one another over a suitable supporting surface. These two sheets are then joined to one another, through the use of a separate bonding agent, along one or more desired seam lines and thereafter the sheets are cut along desired lines of cut to separate the articles from the remainder of the sheets. The line of cut may or may not extend along or adjacent to the seam lines or portions thereof and the articles may or may not be turned inside out following the cutting operation.

The cutter is one which is driven along the desired line of cut by a numerically controlled drive system, and the bonding step is performed by a means which includes either one or two bonding members moved along the desired seam lines. The same numerically controlled drive system as used with the cutter may be used to drive the bonding member or members along the seam lines. The bonding agent may be either a liquid or solid material and may or may not be one requiring some form of activation to produce a bonding effect. As an example of a bonding agent requiring no activation, the bonding agent may be a liquid adhesive which dries relatively rapidly at room temperature. An example of a bonding agent requiring activation is a thermoplastic resin applied either as a highly viscous liquid or solid and requiring activation by heat or other energy to render it fluid so as to enable it to flow into the material of the sheets to be joined to effect a bond after the heat or other energy is removed. When the bonding agent is supplied in solid state it may be applied as a powder by an applicator member movable along the desired seam line, or it may be applied as a sheet or film of bonding agent spread between or on top of the sheets to be joined. In the case where two sheets of material are to be joined, it is usually most effective to apply the bonding agent between the two sheets, but in some instances the bonding agent may also be applied onto the top surface of the top one of such two sheets with the bonding agent flowing downwardly through the top sheet and into the bottom sheet to produce the bonding effect. In cases where the bonding agent is applied along desired seam lines by an applicator member, and when the bonding agent is such as to require activation, the subsequent activation may be accomplished either by exposing the entire area of the sheets to the proper activating influence or by moving an activating member along the seam line with the activator member applying the activating influence only along the path traversed thereby.

Still further, a vacuum may be produced adjacent the surface which supports the sheets to be joined. This vacuum may be used to hold the sheets in place relative to one another and to the supporting surface during the bonding or cutting steps or both and may also be used to exert a pressure between the sheets pressing the sheets together to aid the bonding step. The vacuum may also be applied over the entire area of the sheets or over only a portion of such area which includes the sub-area being worked on at the time.

Figure 2:
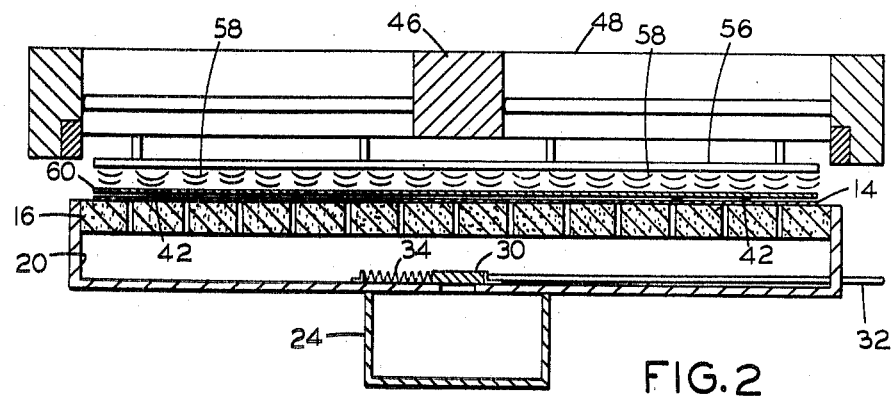
FIG. 2 is a vertical sectional view taken generally on the line 2—2 of FIG. 1 and drawn on a scale slightly enlarged from that of FIG. 1.
Figure 3:
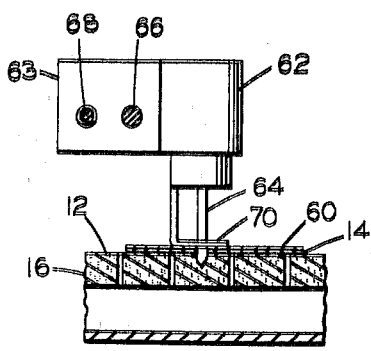
FIG. 3 is a fragmentary vertical sectional view taken on the line 3—3 of FIG. 1 and showing the cutter of the FIG. 1 apparatus.

Turning now to the drawings, FIGS. 1, 2 and 3 illustrate an apparatus 10 comprising one embodiment of this invention. Referring to these figures, the illustrated apparatus comprises a table 11 providing an upwardly facing supporting surface for supporting, in spread condition, a plurality of sheets of sheet material laid on top of one another and from which finished articles are to be made. One such sheet of material is shown at 14 in FIG. 1. The supporting surface 12 is provided by a bed 16 of penetrable material supported on an underlying layer of wire mesh material 18. Below the wire mesh layer 18, the table is divided lengthwise into a number of vacuum chambers 20, 20 by a plurality of transversely extending dividers, one of which is indicated at 22. A vacuum duct 24 extends lengthwise of the table below the bottom floor 26 thereof and communicates with each compartment 20 through a port 28. Each port 28 is normally closed by a valve member 30. Connected with each valve member is an operating rod 32 extending outwardly through one side wall of the table as shown. A spring 34 urges the valve member 30 to its closed position against two stops 36, 36. From the illustrated closed position of FIG. 1 the valve member 30 may be shifted to an open position to connect the associated compartment 20 to the vacuum duct 24 through the port 28 by shifting the operating rod 32 inwardly against the biasing force of the spring 34. The bed 16 is air-permeable so that when vacuum is introduced to any one compartment 20 air passes through it to produce a vacuum at the supporting surface 12 to attract and hold to it a sheet of sheet material, such as the sheet 14, spread thereover. The material of which the bed 16 is made may be one which is naturally air-permeable or may be one which is not air-permeable but which is provided with a large number of passageways, as indicated at 38, 38, drilled or otherwise formed therethrough.

Also included in the apparatus 10 is a means for applying a bonding agent along desired seam lines on the sheet material spread on the supporting surface, a means for activating the deposited bonding agent to effect a bond between two overlying sheets, and a means for cutting the joined sheets along a desired line of cut to separate the articles from the remainder of the sheets. Considering first the bonding agent applicator means, this means in the apparatus 10 comprises a bonding or applicator member 40 in the form of a hollow tube or nozzle from which a bonding agent 42 is ejected from a reservoir 44 onto the upper surface of an underlying sheet as the member is moved thereover. The applicator member 40 and reservoir 44 are supported by a carriage 46 movable in the illustrated Y coordinate direction of FIG. 1 relative to the supporting surface 12. The carriage 46 is in turn carried by another main carriage 48 movable in the illustrated X direction relative to the supporting surface 12. Therefore, by combined movement of the carriage 46 in the Y coordinate direction and movement of the carriage 48 in the X coordinate direction the applicator member 40 may be made to follow along any desired seam line.

The main carriage 48 is supported by and travels along two racks 50, 50 located along opposite sides of the table 11, and the carriage 46 is supported for movement relative to the carriage 48 by a transversely extending guide tube 52 and a transversely extending lead screw 54 both forming part of the carriage 48. A suitable drive motor in the carriage 48 rotates pinions engageable with the racks 50, 50 to move the carriage 48 in the X coordinate direction, and another drive motor in the carriage 48 rotates the lead screw 54 to drive the carriage 46 in the Y coordinate direction. A numerically controlled controller 53 energizes the drive motors of the carriage 48 to cause the applicator member 40 to automatically follow along desired seam lines as dictated by the input to the controller which input, as shown, may constitute a punched paper tape 55.

The activating means of the apparatus 10 is of the type which applies an activating influence over the entire area of the sheets to be joined. Such a means may be a device, such as heating wires buried in the bed 16, for applying the activating influence to the entire area of the sheets at one time, or may be a device which applied the activating influence to a portion of the area and which is progressively swept over the entire surface of the sheets. The applicator means of the apparatus 10 is of the latter type and comprises a heater 56 carried by the main carriage 48 extending transversely of the supporting surface 12 and operable when energized to direct heat energy, indicated by the waves 58, 58 of FIG. 2, onto that portion of the sheet material positioned therebelow. In FIG. 2, the sheet 14 of FIG. 1 is shown to be overlaid by a second sheet 60 to be joined thereto, and lines of bonding agent 42 deposited by previous operation of the applicator member 40 are located between the two sheets. The bonding agent 42 is of a thermoplastic nature so as to be rendered relatively fluid by the heat applied by the heater 56. In the operation of the heater 56 it is moved longitudinally of the table 11 by the carriage 48 over the entire surface of the sheets to be joined at a rate sufficient to properly activate the bonding agent. Preferably, vacuum is applied to the sheets during this step to press the two sheets to one another.

The cutting means of the apparatus 10 comprises a cutter 62 carried by a carriage 63 in turn carried by the main carriage 48. The carriage 63 is movable in the illustrated Y coordinate direction so that by combined movement of the carriage 48 in the X coordinate direction and movement of the carriage 63 in the Y coordinate direction the cutter 62 may be caused to follow along any desired line of cut relative to the sheets supported on the supporting surface. The carriage 63 is supported on the carriage 48 by a guide tube 66 and lead screw 68, as shown in FIg. 3, generally similar to the guide tube 52 and lead screw 54 of the carriage 46, and a motor in the carriage 48 drives the lead screw 68. During the operation of the cutter the motor for its lead screw 68 and the motor for moving the carriage 48 longitudinally of the table are energized in an automatically controlled manner by the controller 53 in response to inputs from the tape 55. Therefore, in the apparatus 10 the same controller 53 as used to drive the bonding agent applicator 40 is used to drive the cutter 62.

The cutter of the apparatus 10 is one which is capable of cutting the material supported on the supporting surface 12 along substantially any line of cut located in the plane of the material and may take various different forms. In the illustrated case, however, the cutter 62 is one having a reciprocating cutting blade 64 which during operation, as shown in FIG. 3, during at least a portion of its stroke extends downwardly below the bottom surface of the bottom sheet 14 and extends into the bed 16 of penetrable material. The blade 64 reciprocates along a vertical axis and the cutter includes a presser foot 70 which surrounds the blade and engages the top surface of the top sheet 60 during the cutting operation. From its cutting position as shown in FIG. 3, the entire cutter 62 may be raised relative to the carriage 48 to bring the blade 64 out of cutting relation with the sheets supported on the supporting surface 12.

The vacuum means previously described may be used during any one or more of the steps of the method performed by the apparatus 10. That is, it may be used during the application of the bonding agent by the applicator member 40, during the activation of the bonding agent by the heater 56, during the cutting of the material by the cutter 62, or during any combination of such steps. In order to conserve the vacuum the apparatus 10 is one wherein the vacuum force is applied to the supported sheets of material only in the general area of such sheets which is being worked on at the time. To accomplish this the carriage 48 carries a longitudinally extending cam bar 72 with operates the rods 32, 32 so that the rod or rods 32, 32 in the vicinity of the carriage 48 are held in their open position or positions by the cam 72 whereby the vacuum compartment or compartments below the general location of the main carriage 48 are opened to the vacuum duct 24. Therefore, the area of the sheets in the vicinity of the tools carried by the carriage 48 are subjected to a vacuum and are drawn to one another and to the supporting surface. Of course, this application of a vaccum only over the area of the sheets being worked on at the time is not necessary and if desired the vacuum system may be designed to apply a vacuum over the entire area of the sheets spread on the supporting surface, as by eliminating the dividers 22, 22 and/or the valves 30, 30.

Figure 4:
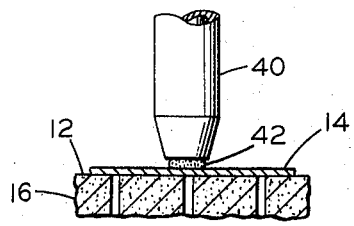
FIG. 4, FIG. 5, FIG. 6, FIG. 7 and FIG. 8 are fragmentary vertical sectional views illustrating progressively various steps of the process of this invention.

FIGS. 4 to 8 illustrate the major steps of the method of this invention as performed by the apparatus 10 of FIGS. 1 to 3. Referring to these figures, FIG. 4 shows the step of applying a bonding agent 42 to the lower sheet 14 by the applicator member 40. Prior to this step, of course, the sheet 14 is first spread over the supporting surface 12 and vacuum may be applied to the sheet through the bed 16 to hold the sheet in place. As the applicator member 40 is moved along the desired seam line the bonding agent 40 is pumped or otherwise caused to flow therethrough so as to deposit a line of the agent onto the sheet 14. Suitable valving in the applicator mechanism may be used to stop and start the flow of the bonding agent therethrough and preferably the lower end of the applicator member 40 is held a short distance above the top surface of the sheet 14 as shown. FIG. 4 shows the applicator member 40 in its lowered operative position, and from this position it may be raised to an inoperative position when not in use.

Figures 5, 6:
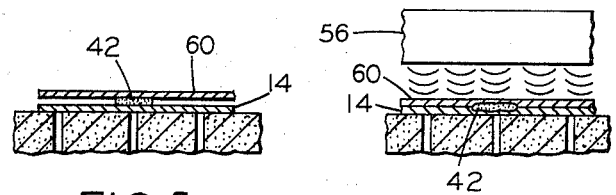

Following the deposition of the bonding agent along the desired seam lines a second sheet 60 of material, to be joined to the first sheet 14, is spread over the first sheet and over the deposited bonding agent 42, as shown in FIG. 5. Thereafter, as shown in FIG. 6, the heater 56 is energized and passed over the sheets 14 and 60 by movement of the carriage and attached heater 56 longitudinally of the table 11 under control of the controller 52 so that heat emitted from the heater and directed downwardly onto the sheets 60 and 14 renders the bonding agent 42 fluid and causes it to flow into the material of the sheets 14 and 60. After the heat is removed from the sheets the bonding agent resolidifies and firmly bonds together the two sheets along the seam lines defined by the bonding agent. Preferably vacuum is applied to the sheets through the bed 16 at least during the time the bonding agent is in a liquid state.

Figure 7:
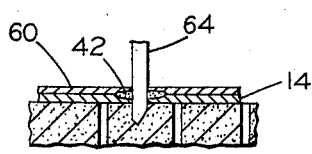
Figure 8:
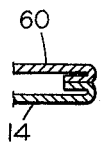

Following the solidification of the bonding agent the sheets 14 and 60 are cut by the tool 64 of the cutter along desired lines of cut to separate the desired articles from the remainder of the sheets 14 and 60. Depending on the nature of the article being made the lines of cut may extend along or adjacent some or all of the seam lines or may be otherwise located. FIG. 7, for example, shows the blade 64 cutting the sheets through the seam line produced by the bonding agent 42, as is the case where the finished article is to be joined along one or more of its edges. When the sheets are cut along a seam line the separated article, as a final step, may be turned inside out, as shown in FIG. 8, so as to hide the cut edge. This, for example, will usually be the case where the articles cut from the sheet material are shirt collars.

Figure 9:
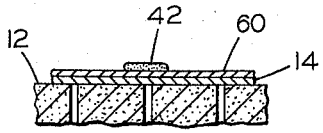
FIG. 9 and FIG. 10 are fragmentary vertical sectional views showing two steps of an alternative process performed in accordance with this invention.
Figure 10:
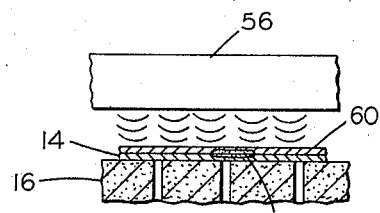

The apparatus disclosed in FIGs. 1 to 3 and the method described in conjunction with FIGS. 4 to 8 are intended to be exemplary only, and it should be understood that various other forms of apparatus and method may be used without departing from the scope of the invention. FIGS. 9 to 12, without limitation, are additional examples of the invention. Considering first FIGS. 9 and 10, these figures illustrate the fact that the bonding agent need not in all cases necessarily be placed between the two sheets to be joined but may instead be applied to the top surface of the top sheet 60, as shown in FIG. 9, after the spreading of the two sheets 14 and 60 on top of one another over the supporting surface 12. Thereafter, as shown in FIG. 10, the bonding agent 42 is activated as by heat from the heater 56 to render it fluid and to cause it to flow downwardly through the top sheet 60 and into the bottom sheet 14. Vacuum may be applied through the bed 16 at this time, as well as throughout other portions of the method, and in addition to pressing the two sheets to one another aids in causing the bonding agent to flow downwardly to and into the bottom sheet 14. Except for this application of the bonding agent to the top surface of the top sheet rather than between the two sheets, the method of FIGS. 9 and 10 may be the same as that described in connection with FIGS. 4 to 8.

Figure 11:
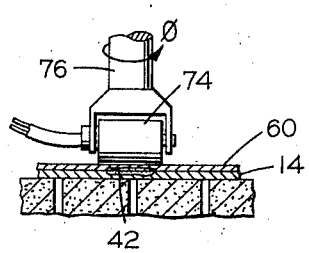
FIG. 11 is a fragmentary vertical sectional view showing one step of another alternative process performed in accordance with this invention.

Instead of an activating means which applies an activating influence over the entire area of the sheets to be joined, the activating means may comprise a bonding or activating member which is moved along the seam lines so as to apply the activating influence only in the vicinity of the bonding agent previously deposited by the applicator member. FIG. 11, for example, shows such an activating member which comprises an electrically heated roller 74 carried by an arm 76. The arm is moved along the seam lines by a numerically controlled drive system and is rotated about its illustrated θ axis to maintain its axis of rotation generally perpendicular to the seam line being worked on at the time. For example, the arm 76 and roller 74 may replace the heater 56 of the apparatus 10 of FIG. 1 and may in such apparatus be mounted on the carriage 46 along with the applicator member 40 so as to be capable of being automatically moved along its path of travel through the agency of the numerical controller 52. FIG. 11 shows the roller 74 in the process of activating the bonding agent 42 and this step may replace the activation step illustrated in FIG. 6, the other steps of the process being the same as that of FIG. 4 to FIG. 8.

Figure 12:
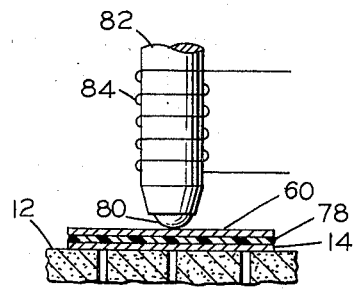
FIG. 12 is a fragmentary vertical sectional view showing one step of a still further alternative process performed in accordance with this invention.

Instead of the bonding agent being deposited by an applicator member only along the desired seam lines, it may also be suppled in the form of a sheet or film of the same spread over the supporting surface along with and preferably between the two sheets to be joined, with the seam lines thereafter being formed by a bonding or activating member movable along such lines. This is, for example, illustrated in FIG. 12 wherein the two sheets 14 and 60 are laid up on the supporting surface 12 with a sheet 78 of thermoplastic bonding agent positioned therebetween. An activating member in the form of a heated ball 80 is then moved over the top surface of the top sheet 60 along the desired seam line to activate the material of the sheet 78 along such seam line. The heated ball 80 is carried in the lower end of an arm 82 by a heating coil 84, and the arm is moved along the desired seam line under automatic control, as, for example, by being attached to the carriage 46 of the apparatus 10 of FIG. 1. After the sheets of FIG. 12 are joined along the desired seam lines by the movement of the heated ball 80 therealong and by the subsequent cooling and hardening of the activated bonding agent, the sheets are cut along the desired lines of cut to form the finished articles, as, for example, as shown in FIG. 7. The unactivated portions of the sheet 78 may then be removed from the finished articles by pulling it from between the unjoined portions of the two sheets 14 and 60.

The heated ball 80 of FIG. 12 is shown merely as an example of another form of activating member movable along the seam lines and various other forms of such members may be used without departing from the invention. Also, it is contemplated that forms of activating energy other than heat may be used in the various illustrated methods to activate the bonding agent if such activation is required. In some cases the activating influence required may be nothing more than pressure applied to press the two sheets to one another. As previously mentioned such pressure may be produced by a vacuum applied to the bottom surface of the bottom sheet. It may, however, be applied by other means as by a pressure roller or rollers extending transversely of the supporting surface and carried by the carriage 48 so as to be movable longitudinally of the supporting surface. Also, the roller 74 of FIG. 11 or the ball 80 of FIG. 12 could be used as a pressure applying member, with or without heat, by biasing it downwardly toward the supporting surface.

In the foregoing descriptions referring to the drawings, it has been assumed that only two sheets of sheet material are to be joined to each other to form the finished articles. However, it should be understood that the invention is not limited to joining only two sheets and may instead be used to join three or more sheets. For example, in FIG. 5 a third sheet may be spread underneath the sheet 14 or in FIG. 9 a third sheet may be spread on top of the sheet 60, and it will be obvious that if the sheets are of sufficiently porous material, if sufficient bonding agent is employed and if the bonding agent is properly activated, it will flow through or into all three sheets so as to join them to one another upon hardening.

As used herein and in the claims which follow the term "bonding member" has been used to refer to any member used in the bonding step and includes both an applicator member for depositing bonding agent and an activator member for activating such agent.

We claim:

1. An apparatus for producing seamed articles from sheet material, said apparatus comprising: means providing a generally planar supporting surface for supporting a plurality of superimposed layers of sheet material in spread condition, means for bonding at least two of said sheets to one another by means of a bonding agent along a desired seam line forming a part of an article, said bonding means including a bonding member, a cutter for cutting said superimposed sheets of sheet material as it is moved along a desired line of cut, means supporting both said bonding member and said cutter for movement in two dimensions relative to and over said supporting surface to enable said bonding member to be moved along a desired seam line on said superimposed sheets of sheet material and to enable said cutter to be moved along a desired line of cut on said superimposed sheets of sheet material which line of cut may be different from and uncorrelated with said seam line, and a drive system associated with said means for supporting both said bonding member and said cutter for automatically driving said bonding member along said desired seam line independently of the movement of said cutter along said desired line of cut and for automatically driving said cutter along said desired line of cut independently of th movement of said bonding member along said desired seam line.

2. An apparatus for producing seamed articles from sheet material as defined in claim 1 further characterized by said bonding member being an applicator member for depositing bonding agent onto one of said sheets of sheet material as it is moved along said desired seam line.

3. An apparatus for producing seamed articles from sheet material as defined in claim 1 further characterized by said bonding member being an activating member operable to activate bonding agent located along its path of travel.

4. An apparatus for producing seamed articles as defined in claim 1 further characterized by means for pressing said superimposed layers of sheet material to one another while they are supported on said supporting surface.

5. An apparatus for producing seamed articles as defined in claim 1 further characterized by means providing a vacuum adjacent said supporting surface for drawing said superimposed layers of sheet material toward said supporting surface and toward one another.

6. An apparatus for producing seamed articles as defined in claim 1 further characterized by said bonding member being an applicator member for depositing a bonding agent onto one of said sheets of sheet material as it is moved along said desired seam line, said bonding agent being one requiring activation by a given influence in order to effect a desired bond between said two sheets, and said bonding means further including an activator means for subsequently applying said given influence to said bonding agent deposited by said applicator member.

7. An apparatus for producing seamed articles as defined in claim 6 further characterized by said activating means being a device extending transversely of said supporting surface and operable to exert an activating influence on an associated transversely extending area of said sheets.

8. An apparatus for producing seamed articles from sheet material as defined in claim 1 further characterized by said bonding member being an applicator member for depositing a bonding agent onto one of said sheets of sheet material as it is moved along said desired seam line, said bonding agent being one requiring activation by a given influence in order to effect a desired bond between said two sheets, and said bonding means further including member subsequently movable along said desired seam line for applying said given influence to said bonding agent deposited by said applicator member.

9. An apparatus for producing seamed articles a defined in claim 1 further characterized by said activating member being a heated member supported for rolling movement over the upper surface of said two superimposed sheets of sheet material.

10. An apparatus for producing seamed articles as defined in claim 2 further characterized by said applicator member being a tubular nozzle through which said bonding agent is ejected onto said one of said sheets of sheet material.

11. An apparatus for producing seamed articles as defined in claim 2 further characterized by said means providing a supporting surface being a bed of penetrable material, and said cutter having a reciprocating cutting tool which when cutting said sheets of sheet material during at least a portion of its stroke extends beyond the lower one of said sheets and penetrates said penetrable material.

12. An apparatus for producing seamed articles as defined in claim 11 further characterized by means providing a vacuum adjacent said supporting surface for drawing said superimposed layers of sheet material toward said supporting surface and toward one another.

13. An apparatus for producing seamed articles as defined in claim 12 further characterized by said bed of penetrable material being air permable and said means for producing a vacuum adjacent said supporting surface comprising means for exposing a portion of said bed to a vacuum source so that air passes through said bed of penetrable material to said supporting surface to produce a vacuum at said supporting surface.

* * * * *

UNITED STATES PATENT OFFICE
CERTIFICATE OF CORRECTION

Patent No. 3,785,898  Dated January 15, 1974

Inventor(s) Heinz J. Gerber and David R. Pearl

It is certified that error appears in the above-identified patent and that said Letters Patent are hereby corrected as shown below:

Col. 1, line 48, "a" should read --an--

Col. 5, line 46, "with" should read --which--

Col. 7, line 46, after "82" insert --heated--

Col. 8, line 58, "th" should read --the--

Col. 10, line 1, after "including" insert --a second bonding member in the form of an activating--

Col. 10, line 5, "a" should read --as--

Col. 10, line 16, "claim 2" should read --claim 1--

Col. 10, line 32, "permable" should read --permeable--

Signed and sealed this 20th day of August 1974.

(SEAL)
Attest:

McCOY M. GIBSON, JR.
Attesting Officer

C. MARSHALL DANN
Commissioner of Patents